(12) United States Patent
Cronie et al.

(10) Patent No.: US 10,846,281 B2
(45) Date of Patent: Nov. 24, 2020

(54) ELECTRONIC NODE AND METHOD FOR MAINTAINING A DISTRIBUTED LEDGER

(71) Applicant: Sony Corporation, Tokyo (JP)

(72) Inventors: Harm Cronie, Echallens (CH); Julian Nolan, Pully (CH)

(73) Assignee: Sony Corporation, Tokyo (JP)

(*) Notice: Subject to any disclaimer, the term of this patent is extended or adjusted under 35 U.S.C. 154(b) by 383 days.

(21) Appl. No.: 15/819,418

(22) Filed: Nov. 21, 2017

(65) Prior Publication Data
US 2018/0218027 A1 Aug. 2, 2018

(30) Foreign Application Priority Data

Jan. 31, 2017 (EP) .................................... 17154055

(51) Int. Cl.
*G06F 16/23* (2019.01)
*G06F 16/2457* (2019.01)
(Continued)

(52) U.S. Cl.
CPC .... *G06F 16/2365* (2019.01); *G06F 16/24575* (2019.01); *G09C 1/00* (2013.01); *H04L 9/32* (2013.01); *H04L 9/0637* (2013.01); *H04L 9/0643* (2013.01); *H04L 2209/30* (2013.01); *H04L 2209/38* (2013.01); *H04L 2209/56* (2013.01)

(58) Field of Classification Search
CPC . G06F 16/2365; G06F 16/24575; H04L 9/32; H04L 2209/56; H04L 2209/38; H04L 2209/30; H04L 9/0643; H04L 9/0637; G09C 1/00
See application file for complete search history.

(56) References Cited

U.S. PATENT DOCUMENTS

| 2014/0070966 | A1* | 3/2014 | Fablet | H03M 7/3086 341/55 |
| 2017/0243176 | A1* | 8/2017 | Hanke | H04L 9/3239 |
| 2018/0089642 | A1* | 3/2018 | Suresh | G06Q 20/0658 |

FOREIGN PATENT DOCUMENTS

| CN | 105741095 A | * | 7/2016 |
| WO | WO 2015/077378 A1 | | 5/2015 |

OTHER PUBLICATIONS

Royal Holloway University of London ("Conquering Generals NP—Hard Proof of Work for Blockchain Construction", Retrieved from the internet: https://dc4420.org/slides/2017-10-31/Conquering Generals_NPHard_PoW.pdf, Sep. 2, 2017) (Year: 2017).*

(Continued)

*Primary Examiner* — Robert W Beausoliel, Jr.
*Assistant Examiner* — Mohammad Solaiman Bhuyan
(74) *Attorney, Agent, or Firm* — Wolf, Greenfield & Sacks, P.C.

(57) ABSTRACT

An electronic device for maintaining a distributed ledger, which is maintained by multiple electronic nodes, wherein the distributed ledger includes multiple blocks which are associated at least with one of the previously recorded blocks and wherein a block can be added to the distributed ledger based on a mining process, has circuitry configured to perform a mining process of a block to be added to the distributed ledger, wherein the mining process by at least a part of the multiple electronic nodes includes compressing data of the block to be added to the distributed ledger.

17 Claims, 2 Drawing Sheets

(51) Int. Cl.
*G09C 1/00* (2006.01)
*H04L 9/32* (2006.01)
*H04L 9/06* (2006.01)

(56) References Cited

OTHER PUBLICATIONS

Bruce J.D., Purely P2P Crypto-Currency With Finite Mini-Blockchain, www.bitfreak.info/, May 2013, Retrieved Nov. 8, 2017 from https://pdfs.semanticscholar.org/3f64/123ce97a0079f8bea66d3f760dbb3e640d5.pdf , 15 pages.
Christidis et al., Blockchains and Smart Contracts for the Internet of Things, IEEE Access, Special Section on the Plethora of Research in Internet of Things (IoT), 2016, vol. 4, pp. 2292-2303.
Naik R., Optimising the SHA256 Hashing Algorithm for Faster and More Efficient Bitcoin Mining, MSc Information Security, Department of Computer Science, Sep. 2, 2013, 65 pages.
Patel_et al., Blockchain Exhumed, Asia Security and Privacy (ISEASP), Surat, 2017, doi: 10.1109/ISEASP.2017.7976993, http://ieeexplore.ieee.org/stamp/stamp.jsp?tp=&arnumber=7976993&isnumber=7976974, 12 pages.
Stenum et al., The Use of Block Chain Technology in Different Application Domains, Bachelor Project in Software Development, The IT University of Copenhagen, May 20, 2015, 109 pages.
Extended European Search Report dated Aug. 2, 2017 in connection with European Application No. 17154055.2.

\* cited by examiner

ELECTRONIC NODE AND METHOD FOR
MAINTAINING A DISTRIBUTED LEDGER

CROSS REFERENCE TO RELATED
APPLICATIONS

This application claims the benefit of European Priority Patent Application 17154055 filed Jan. 31, 2017, the entire contents of which are incorporated herein by reference.

TECHNICAL FIELD

The present disclosure generally pertains to an electronic node and a method for maintaining a distributed ledger.

TECHNICAL BACKGROUND

Generally, it is known to distribute a ledger over multiple entities, e.g. electronic devices, servers or the like, which record digital transactions. Distributed ledgers can be based on the known blockchain technology, on which, for example, the known cryptocurrency bitcoin is based. There is no unified definition about the terms of blockchain and distributed ledger yet. Here, in the broadest definition, the terms are used as a type of database shared digitally recorded data with multiple nodes of a network. It may be comprised of peer to peer network. The digitally recorded data may include a kind of information to prove its consistency from the previously recorded data on the same database. Distributed ledgers can be public and can be accessible by anyone, but, in principle, they can also be non-public and only users having a permission may have access to them. It is also possible to differentiate the access permission to data on a ledger from each layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

In a distributed ledger or blockchain, a confirmation process to make a consensus about data renewal on a blockchain in attending nodes, called a mining process, may achieve irreversibility of the sequence of transactions recorded on the blockchain by including previous recorded data in the confirming data. Such mining process implements a distributed timestamp server for a new block of transactions. In bitcoin the mining process is based on the SHA-256 hash function. Nodes of the blockchain that participate in the mining process search for a hash output with predefined properties while the input of the hash function depends on the current blocks of the blockchain and the new block of transactions to be added to the blockchain.

Proof-of-work computations based on hash functions may not be useful in themselves except that they are required to implement the irreversibility of the distributed ledger. The mining process is sometimes seen as a waste of resources. This may not be a problem for dedicated server farms that execute the mining process. However, when other devices such as Internet-of-Things (IoT) are to execute the mining process, the situation may be different.

Moreover, generally, it is known to use a blockchain for storing a variety of data. For instance, images, videos, measurements, and text files can be recorded on the blockchain in the form of a transaction.

Although there exist techniques for maintaining a distributed ledger, it is generally desirable to improve the distributed ledger technology.

The solutions disclosed here may be replaced with using distributed database technologies like Hadoop.

SUMMARY

According to a first aspect, the disclosure provides an electronic device for maintaining a distributed ledger, which is maintained by multiple electronic nodes, wherein the distributed ledger includes multiple blocks which are associated at least with one of the previously recorded blocks and wherein a block can be added to the distributed ledger based on a mining process by at least a part of the multiple electronic nodes, the electronic device comprising circuitry configured to perform a mining process of a block to be added to the distributed ledger, wherein the mining process includes compressing data of the block to be added to the distributed ledger.

According to a second aspect, the disclosure provides a method for maintaining a distributed ledger, which is maintained by multiple electronic nodes, wherein the distributed ledger includes multiple blocks which are associated at least with one of the previously recorded blocks and wherein a block can be added to the distributed ledger based on a mining process by at least a part of the multiple electronic nodes, the method comprising performing a mining process of a block to be added to the distributed ledger, wherein the mining process includes compressing data of the block to be added to the distributed ledger.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
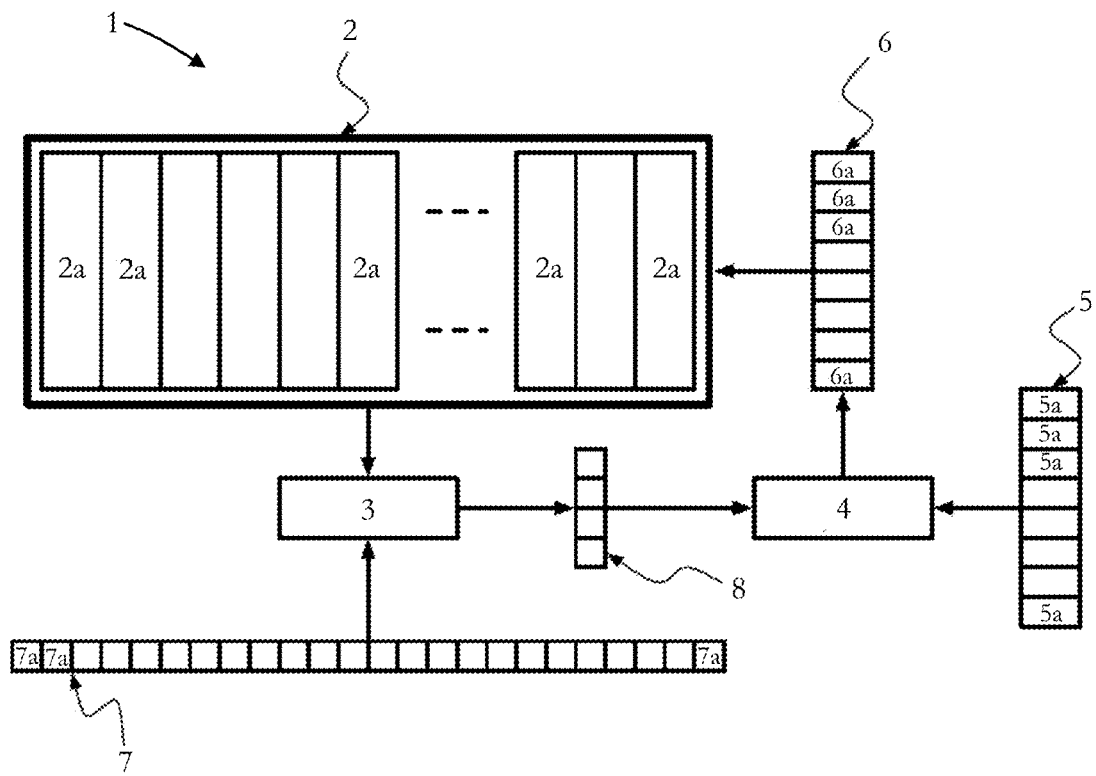
FIG. 1 illustrates an electronic node for maintaining a blockchain.

Before describing embodiments under reference of FIG. 1 in detail, general explanations are given. As mentioned in the outset, generally, it is known to distribute a ledger over multiple entities, e.g. electronic devices, servers or the like, which record digital transactions. Distributed ledgers can be based on the known blockchain technology in some embodiments, on which, for example, the known cryptocurrency bitcoin is based. There is no unified definition about the terms of blockchain and distributed ledger yet. Here, in the broadest definition, the terms are used as a type of database shared digitally recorded data with multiple nodes of a network. It may be comprised of peer to peer network. The digitally recorded data may include a kind of information to prove its consistency from the previously recorded data on the same database.

In some embodiments, distributed ledgers can be public and can be accessible by anyone, but, in principle, they can also be non-public and only users having a permission may have access to them. It is also possible to differentiate the access permission to data on a ledger from each layered users. Distributed ledgers can use mechanisms in some embodiments, which are known, for example, from the blockchain technology as used for bitcoin. Such mechanisms include a discovery method, a consensus mechanism, a mechanism to keep data consistency and so on. The consensus mechanism ensures that all odes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

In a distributed ledger or blockchain, a confirmation process to make a consensus about data renewal on a blockchain in attending nodes, called a mining process, may achieve irreversibility of the sequence of transactions recorded on the blockchain by including previous recorded data in the confirming data. Such mining process implements a distributed timestamp server for a new block of transactions. In bitcoin the mining process is based on the SHA-256 hash function. Nodes of the blockchain that participate in the mining process search for a hash output with predefined properties while the input of the hash function depends on the current blocks of the blockchain and the new block of transactions to be added to the blockchain.

As discussed in the outset, proof-of-work computations based on hash functions may not be useful in themselves in some embodiments, except that they are required to implement the irreversibility of the distributed ledger. The mining process is sometimes seen as a waste of resources. This may not be a problem for dedicated server farms that execute the mining process. However, when other devices such as Internet-of-Things (IoT) are to execute the mining process, the situation may be different.

In some embodiments, a distributed ledger, such as a blockchain can be used to store a variety of data. For instance images, videos, measurements, and documents, e.g. text files can be recorded on the blockchain, for example, in the form of a transaction.

It has been recognized that the size of the overall distributed ledger, such as a blockchain may become very large and storage of the whole distributed ledger may require considerable storage space.

Hence, some embodiments address a proof-of-work function or mining process for a distributed ledger, such as a blockchain, that uses mining such that the computations performed are actually useful for the distributed ledger itself.

Consequently, some embodiments pertain to an electronic node, e.g. electronic device, for maintaining a distributed ledger, which is maintained by multiple electronic nodes, wherein the distributed ledger includes multiple blocks which are associated at least with one of the previously recorded blocks (e.g. chained together) and wherein a block can be added to the distributed ledger based on a mining process, e.g. by at least a part of the multiple electronic nodes. The electronic node includes circuitry configured to perform a mining process of a block to be added to the distributed ledger, wherein the mining process includes compressing data of the block to be added to the distributed ledger.

The electronic node may be an electronic device and the circuitry may include a processor, a memory, a storage, (wireless and/or network) interface and other components which are typically included in an electronic device. The electronic device may be a personal computer, a server, a tablet computer, a mobile phone, a smartphone, laptop computer, an Internet-of-Things device, etc.

The electronic node may be configured to communicate over a network with the other electronic nodes, e.g. over a local area network, a wireless network, etc., including the internet.

The distributed ledger is distributed over the electronic nodes, e.g. electronic devices, servers, or the like (see above), which may be interconnected with each other, for example, over a network, which may include the internet, and which may be nodes of a network, e.g. of a distributed ledger network. The distributed ledger may be a blockchain, which may be based, for example, on the principles used for the bitcoin blockchain or the like. The distributed ledger uses mining and proof-of-work mechanisms and it may use some kind of reward (currency), such as bitcoin as currency and/or as reward for performing mining. Moreover, the distributed ledger may use consensus mechanisms for ensuring that all electronic nodes have consensus about the distributed ledger.

The blocks may be chained together or associated at least with one of the previously recorded blocks, based on hash values of the blocks, as it is known for the blockchain. The blocks may include any type of data, such as transaction data, as it is known, for example for the bitcoin blockchain, but they may also include other types of data, such as video data, image data, audio data, document data (text, tables, presentations, etc.), etc.

As mentioned, the mining process of a block which shall be added to the distributed ledger includes compressing data of the block. In some embodiments, the mining process is won by the electronic node which provides the smallest block which is to be added, i.e. the block having the best compression may win.

In some embodiments, the circuitry is further configured to perform a computational complex compression algorithm for compressing data. Thereby, it is ensured that the compression of the block is not simple and the security of the distributed ledger is increased, since it would need an unreasonable large computational power for re-computing a complete distributed ledger (blockchain), for example, for attacking integrity of the distributed ledger.

In some embodiments, the compression algorithm is based on a non-deterministic polynomial-time ("NP") hard search problem which is known in the field of computational complexity theory.

Thereby, the computational complexity of compressing data of the block may be very large, whereby security of the distributed ledger against integrity attacks can be further improved.

In some embodiments, the compression of the data is further based on a current state of the distributed ledger. For instance, the compression of the data of a block to be added may use information, data or the like, of the current distributed ledger for compressing the data.

In some embodiments, each block includes multiple sub-blocks, wherein a sub-block may include at least one of: transaction data, video data, image data, audio data, document data or the like.

In some embodiments, the compression may include representing data of the block based on a predefined dictionary. The dictionary may be also based on information of the distributed ledger and/or on the data of the block to be compressed and to be added to the other blocks to the distributed ledger.

The predefined dictionary may include a set of dictionary elements, wherein the set of dictionary elements may be adapted to the data of the block to be compressed. In some embodiments, the dictionary elements are also called "atoms", as it is also generally known in the technical field of dictionary based compression algorithms. The dictionary elements (e.g. atoms) may be selected, based on the content of the blocks. For example, in the case of audio data to be compressed, the dictionary elements may be audio elements, in the case of video data, the dictionary elements may be video elements, in the case of text data, the dictionary elements may be words, etc.

A subset of the set of dictionary elements may be selected based on a current status of the distributed ledger. For example, the dictionary elements may be based on data, information (e.g. content information or the like) of the current block to be compressed. The dictionary elements may also be based on blocks, which are newly added, or on other information.

Some embodiments pertain to a method for maintaining a distributed ledger, which is maintained by multiple electronic nodes, wherein the distributed ledger includes multiple blocks which are associated at least with one of the previously recorded blocks and wherein a block can be added to the distributed ledger based on a mining process. The method includes performing a mining process of a block to be added to the distributed ledger, wherein the mining process includes compressing data of the block to be added to the distributed ledger, as also discussed above. The method may be performed by the electronic node discussed above and the description given above fully applies to the method described herein. As discussed, the compression of data may be based on a computational complex compression algorithm for compressing data. The compression algorithm may be based on a non-deterministic polynomial-time hard search problem. The compression of data may be further based on a current state of the distributed ledger. Each block may include multiple sub-blocks. A sub-block may include at least one of: transaction data, video data, image data, audio data, document data or the like. The compression may include representing data of the block based on a predefined dictionary. The predefined dictionary may include a set of dictionary elements. The set of dictionary elements may be adapted to the data of the block to be compressed.

A subset of the set of dictionary elements may be selected based on a current status of the distributed ledger.

Hence, in some embodiments, a new block is added in a compressed format to the blockchain, and the task of compression is performed in a competitive manner by electronic nodes that perform mining. The electronic node which provides the smallest compressed version of the new block wins the mining process and can be awarded accordingly in some embodiments. As also discussed above, the compression scheme may be based on a dictionary compression scheme where the task is to express the data in the new block in terms of a sparse combination of the elements of the dictionary, whereby a high compression can be achieved in some embodiments. One or multiple dictionaries may be pre-defined for a blockchain and the dictionary to use may depend on the data type to be compressed, such that, for example, pre-working of a compression of data of a block can be avoided in some embodiments.

The dictionary compression scheme may be based on a subset of the elements of the full dictionary. The blocks that are already present in the blockchain may determine the subset of the dictionary that is used. In such a way the compression scheme depends on the blocks already present in the blockchain and irreversibility of the blockchain is achieved.

The decompression of a compressed block, may require the knowledge of the dictionary, the subset of dictionary elements used for compression, and a set of coefficients which determine how the original block is expressed in terms of the subset of the dictionary elements. The dictionary itself can be fixed for a blockchain. The previous blocks in the chain may determine the subset of dictionary elements, and the coefficients may be stored in the compressed block that is added to the chain.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

Returning to FIG. 1, there is schematically illustrated an electronic node 1, as discussed above, which maintains a blockchain 2, wherein blockchain 2 is a copy of the blockchain stored in a storage of the electronic node 1. The electronic node 1 has a dictionary subset selection unit (DSSU) 3 and a dictionary compression unit (DCU) 4.

The blockchain 2 is maintained by a set of electronic nodes, wherein each electronic node may store a local copy of the blockchain and wherein the electronic nodes may be connected to each other via a network including the internet. The multiple electronic nodes maintaining the blockchain have consensus about the blockchain 2, e.g. by applying a respective consensus algorithm.

The blockchain 2 has multiple blocks 2a, which are chained together and when a new block, such as block 5 illustrated in FIG. 1, becomes available it is added to the blockchain 2 through a mining process.

As also discussed above, the mining process is designed such that a block 2a in the blockchain 2 cannot be changed without performing the mining process of all consecutive blocks again. It is assumed that the mining process is computationally intensive such that such computations are prohibitively complex, as will be discussed further below. In effect, the blockchain 2 becomes irreversible.

A block has several sub-blocks, wherein each sub-block may be for instance a transaction. For instance, the block 5 to be added to the blockchain 2 has multiple sub-blocks 5a. As also discussed above, the sub-blocks 5a may also have other data than transaction data, such as images, videos, speech, audio, mp3 files, and text files or the like. In this case, each of the blocks may be rather large, in particular in the case of audio/video files, for example, and efficient storage may be required.

In the present embodiment, as also discussed above, operations expended for the mining process are used to compress the sub-blocks 5a of the new block 5. The resulting compressed block 6 in FIG. 1 is added to the blockchain 2. By compressing the blocks, the required storage space for the blockchain 2 can be reduced. As mentioned above, the electronic nodes, such as electronic node 1, that perform mining run a competitive compression algorithm on the sub-blocks 5*a* of the new block 5, and the electronic node which provides the smallest compressed block 6 wins the mining process and the respective block 6 is added as new block to the blockchain 2.

In the present embodiment, for the compression algorithm to serve as a proof-of-work function, two conditions are met. First, the compression algorithm is computationally complex and in the present embodiment, the compression algorithm is based on an NP hard search problem. Second, the compression of a new block depends on the current state or blocks in the blockchain 2. In the present embodiment, by using these two conditions the compression is used as a proof-of-work function. The compression algorithm has a good compression performance such that new blocks can be added to the chain efficiently.

For the following description it is assumed, without limiting the present disclosure in that regard, that the new block 5 only contains sub-blocks 5*a* of the same type (e.g. images).

As mentioned, the electronic node 1 has the dictionary compression unit (DCU) 4, which takes as an input the new block 5 including multiple sub-blocks 5*a*. The DCU 4 compresses the new block 5 into a compressed block 6 that is added to the blockchain 2.

The DCU 4 represents each of the sub-blocks 5*a* in terms of a predefined dictionary of so-called atoms. Typically, such representation is sparse in the sense that only a small subset of the dictionary elements is used in the representation. Such sparseness leads to the actual compression.

Dictionary compression algorithms or dictionary representation algorithms are generally known and an embodiment of a dictionary compression algorithm is discussed further below. In essence, the atoms of the dictionary may be prototypes for the sub-blocks in the new block. For instance, when the sub-blocks are images, the atoms may be prototype images or wavelets. The dictionary is typically over-complete and may consist of millions to billions of atoms.

In the embodiment of FIG. 1, there is provided a main dictionary 7 that is fixed for the blockchain 2 and which includes multiple atoms 7*a*. The atoms 7*a* of the dictionary 7 are stored explicitly with the blockchain 2 in the electronic node 1. In other embodiments, an implicit description of the dictionary 7 may be sufficient. For instance, in cases where the new block has sub-blocks that are images, the dictionary items or atoms 7*a* may be defined by a parameterized family of wavelets, which do not have to be stored explicitly.

In the present embodiment of FIG. 1, the operation of the DCU 4 depends on the current blocks 2*a* in the blockchain 2, since the dictionary compression algorithm does not use the main dictionary 7, but a subset 8 of the dictionary 7. As mentioned, the electronic node 1 has the dictionary subset selection unit (DSSU) 3, which selects the subset 8 of the atoms 7*a* of the main dictionary 7, based on the current blocks 2*a* in the blockchain 2.

This leads to the subset dictionary 8, which is used as the dictionary for the dictionary compression algorithm. Thus, when a block 2*a* of the blockchain 2 is changed all the consecutive blocks of the blockchain 2 would have to be recompressed, since the subset dictionary changes for each consecutive block. Since the original dictionary 7 can be over-complete, a restriction to a subset 8 of the dictionary elements or atoms 7*a* does not necessarily lead to decreasing compression performance.

Figure 2:
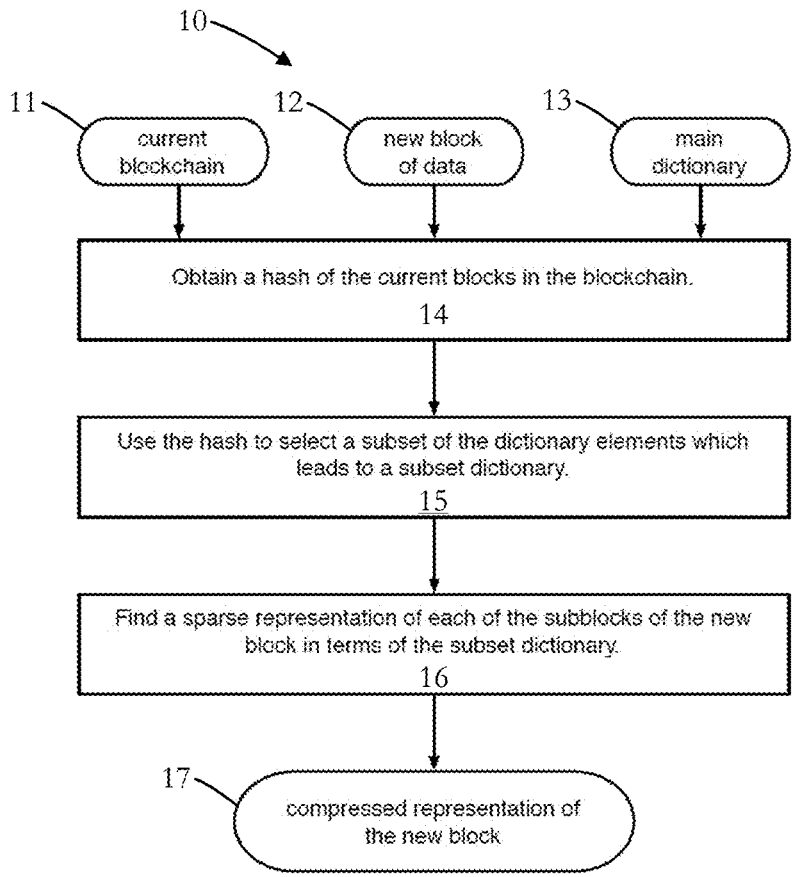
FIG. 2 illustrates a compression method which can be performed by the electronic node of FIG. 1.
Figure 3:
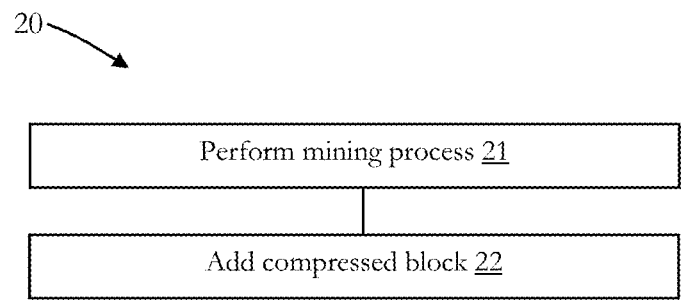
FIG. 3 illustrates a method for maintaining a blockchain which can be performed by the electronic node of FIG. 1.

The operation of the DSSU 3 and the DCU 4 of the electronic node 1 of FIG. 1 is now further described under reference of FIG. 2.

FIG. 2 illustrates a method 10 for compressing a new block. At 11 the current set of blocks 2*a* of the blockchain 2 is input, at 12 a new block 5 having multiple sub-blocks 5*a* is input, and at 13 the main dictionary 7 is input.

At 14, a hash is obtained from the current compressed blocks 2*a* in the blockchain 2. This hash is used at 15 to select a subset of the atoms 7*a* of the main dictionary 7 leading to a subset dictionary 8. For example, if the main dictionary 7 consists of N atoms 7*a* the subset dictionary 8 may consist of e.g. N/2 atoms.

There exist many embodiments for selecting the items of the subset dictionary 8. For instance, the hash computed at 14 may be converted into a sequence of d bits, wherein d=log 2(N). The ith atom from the main dictionary 7 is selected for the subset dictionary 8, if the ith bit of the sequence of d bits is 1. If the ith bit is 0, the corresponding atom in the main dictionary 7 is not selected for the subset dictionary 8.

At 16 a sparse representation for each of the sub-blocks 5*a* in the new block 5 is computed. These sparse representations are output at 17 as the compressed version 6 of the block 5.

The details of computing a sparse representation are described in further below. The compressed block 6 contains the coefficients of the sparse representation. Since for a block 5 the subset dictionary 8 depends on the previous blocks 2*a* of the blockchain 2, decompression can be performed with knowledge of these coefficients and the previous set of blocks 2*a*.

Storing the sparse representation may lead to a lossy compression scheme, which is acceptable for many types of data such as images and video. In embodiments requiring a (nearly) lossless compression, the error made with the sparse approximation is encoded in an exact manner with an entropy-coding scheme such that a lossless scheme is implemented in some embodiments.

In one embodiment the selection of the subset dictionary 8 is based on the current new block 5 of transactions and the current blockchain 2. This prevents in some embodiments that electronic nodes with a lot of computational power can perform pre-computations that may speed up the compression performance.

The electronic nodes, such as electronic node 1, which participate in mining may implement the method 10 as discussed under reference of FIG. 2.

As discussed, the competitive step between the electronic nodes is the compression operation where a sparse representation of each of the sub-blocks is found in terms of the subset dictionary. The node that provides the shortest/smallest representation wins the mining process in the embodiments discussed under reference of FIGS. 1 and 2, and the corresponding sparse representation is stored together with the compressed block in the blockchain 2.

In the following, a scheme is discussed, which can be used as a dictionary compression scheme and which is a sparse approximation algorithm and which is based, for example, on the known matching pursuit algorithm.

In this scheme a dictionary D has N elements, which are called atoms, as also discussed above. The data to be compressed is interpreted as a signal or element/from a vector space or Hilbert space.

Now, the idea is to express the signal f in terms of the atoms of the dictionary:

$$f(x) = \sum_{i=1}^{N} a_i h_i(x),$$

wherein $h_i(x)$ is a dictionary atom and $a_i$ a coefficient.

In a sparse representation, only a small subset of the N coefficients is non-zero. In general the approximation is not exact and a small error is made in the approximation. Storing only the non-zero coefficients $a_i$ leads to a compression of the original signal f. The choice of dictionary depends on the characteristics of the signals f that are compressed. For instance, when the signals are images, the dictionary atoms may be prototype images or a wavelet basis, as also discussed above.

In general, finding a sparse approximation is a hard problem since it involves choosing a subset of the atoms which are used for the approximation. In the context of the present disclosure, the size of the subset could be fixed to, for example, an integer number K, and then the mining process involves finding K atoms of the dictionary that lead to the best approximation.

Alternatively, it is required that the approximation error is below a threshold value and then the task is to find a minimal K and corresponding atoms that achieve such an approximation error below the threshold value.

The matching pursuit algorithm uses a greedy approach, e.g. a greedy algorithm. In other embodiments, a full search may be performed.

In another embodiment, a related computational problem is used for the mining process, namely jointly finding the dictionary and the sparse representation, which is known to be NP hard.

The electronic nodes, which perform mining, may all find a sparse representation of the sub-blocks of the new block, wherein representations are provided with respect to a set of atoms of the subset dictionary. In some embodiments, the indices of these atoms are stored as metadata together with the coefficients of the approximation, wherein sub-blocks can be reconstructed based on the metadata and the coefficients of the approximation. As mentioned, in some embodiments, in which a lossless compression is required, the error made with the approximation may be encoded in a lossless fashion, and the encoded error is also stored, e.g. in the blockchain or together with the blockchain.

In the following, a method 20 for maintaining a distributed ledger, such as blockchain 2 discussed above, which is maintained by multiple electronic nodes, such as electronic node 1 discussed above, is described. The distributed ledger has multiple blocks, e.g. blocks 2a, which are chained together and a new block, e.g. block 5, is added to the distributed ledger based on a mining process, as discussed above in detail.

At 21 a mining process of a block to be added to the distributed ledger is performed, wherein the mining process includes compressing data of the block to be added to the distributed ledger, as discussed above.

As discussed above, the compression of data is based on a computational complex compression algorithm for compressing data, which, in turn is based on a non-deterministic polynomial-time hard search problem. As discussed, the compression of the data may be further based on a current state of the distributed ledger.

Each block may include multiple sub-blocks, wherein a sub-block may include at least one of: transaction data, video data, image data, audio data, document data.

The compression may include representing data of the block based on a predefined dictionary, as discussed above, wherein the predefined dictionary may include a set of dictionary elements and wherein the set of dictionary elements may be adapted to the data of the block to be compressed.

The subset of the set of dictionary elements may be selected based on a current status of the distributed ledger.

At 22, the compressed block is added to the blockchain if it has the best compression.

The main advantage of the invention is that a mining process based on a proof-of-work function performs operations that are useful for the blockchain itself. The proof-of-work function is implemented as a competitive compression process with the goal to find a compression of a new block of transactions. The node that finds the smallest compressed block wins the mining process and may be remunerated accordingly. The construction of the proof-of-work function is such that irreversibility of the blockchain may be maintained.

Figure 4:
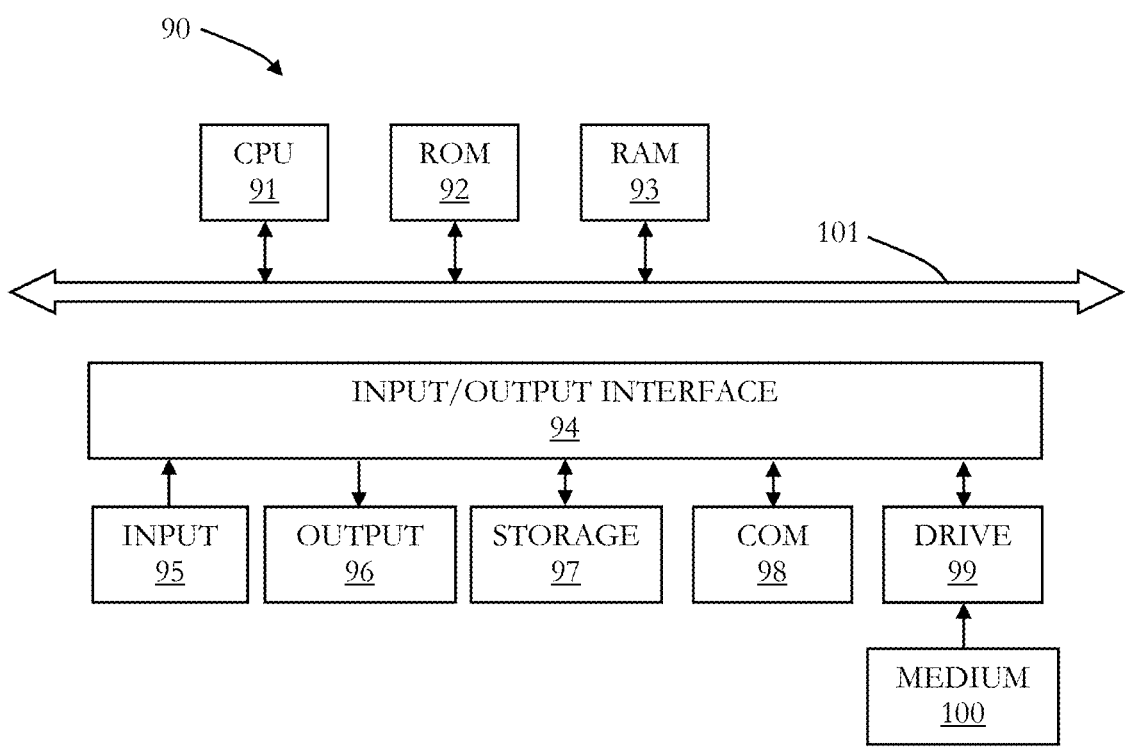
FIG. 4 illustrates a computer which can implement the electronic node of FIG. 1.

In the following, an embodiment of a general purpose computer 90 is described under reference of FIG. 4. The computer 90 can be such implemented that it can basically function as an electronic node 1 described herein. The computer has components 91 to 100, which can form a circuitry, such as any one of the circuitries of the apparatus described herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which, in turn is connected to an input/output interface 94. The number of CPUs, memories and storages is only exemplary, and the skilled person will appreciate that the computer 90 can be adapted and configured accordingly for meeting specific requirements which arise, when it functions as an apparatus described herein.

At the input/output interface 94 several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen, etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90. Alternative configurations may be implemented with additional or other sensors, storage devices, interfaces or the like.

It should be recognized that the embodiments describe methods which are executed by the circuitry of the system, device or the like described herein. The skilled person will appreciate that these methods can also be part of a method for maintaining a distributed ledger. The specific ordering of the steps discussed herein is given for illustrative purposes only and should not be construed as binding.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device for maintaining a distributed ledger, which is maintained by multiple electronic nodes, wherein the distributed ledger includes multiple blocks which are associated at least with one of the previously recorded blocks and wherein a block can be added to the distributed ledger based on a mining process by at least a part of the multiple electronic nodes, the electronic device comprising circuitry configured to:
  perform a mining process of a block to be added to the distributed ledger, wherein the mining process includes compressing data of the block to be added to the distributed ledger.

(2) The electronic device of (1), wherein the circuitry is further configured to perform a computational complex compression algorithm for compressing data.

(3) The electronic device of (2), wherein the compression algorithm is based on a non-deterministic polynomial-time hard search problem.

(4) The electronic device of anyone of (1) to (3), wherein the compression of the data is further based on a current state of the distributed ledger.

(5) The electronic device of anyone of (1) to (4), wherein each block includes multiple sub-blocks, wherein a sub-block includes at least one of: transaction data, video data, image data, audio data, document data.

(6) The electronic device of anyone of (1) to (5), wherein the compression includes representing data of the block based on a predefined dictionary.

(7) The electronic device of (6), wherein the predefined dictionary includes a set of dictionary elements and the set of dictionary elements is adapted to the data of the block to be compressed.

(8) The electronic node of (7), wherein a subset of the set of dictionary elements is selected based on a current status of the distributed ledger.

(9) A method for maintaining a distributed ledger, which is maintained by multiple electronic nodes, wherein the distributed ledger includes multiple blocks which are associated at least with one of the previously recorded blocks and wherein a block can be added to the distributed ledger based on a mining process by at least a part of the multiple electronic nodes, the method comprising:
  performing a mining process of a block to be added to the distributed ledger, wherein the mining process includes compressing data of the block to be added to the distributed ledger.

(10) The method of (9), wherein the compression of data is based on a computational complex compression algorithm for compressing data.

(11) The method of (10), wherein the compression algorithm is based on a non-deterministic polynomial-time hard search problem.

(12) The method of anyone of (9) to (11), wherein the compression of the data is further based on a current state of the distributed ledger.

(13) The method of anyone of (9) to (12), wherein each block includes multiple sub-blocks, wherein a sub-block includes at least one of: transaction data, video data, image data, audio data, document data.

(14) The method of anyone of (9) to (13), wherein the compression includes representing data of the block based on a predefined dictionary.

(15) The method of (14), wherein the predefined dictionary includes a set of dictionary elements.

(16) The method of (15), wherein the set of dictionary elements is adapted to the data of the block to be compressed.

(17) The method of (16), wherein a subset of the set of dictionary elements is selected based on a current status of the distributed ledger.

(18) A computer program comprising program code causing a computer to perform the method according to anyone of (9) to (17), when being carried out on a computer.

(19) A non-transitory computer-readable recording medium that stores therein a computer program product, which, when executed by a processor, causes the method according to anyone of (9) to (17) to be performed.

The invention claimed is:

1. An electronic device for maintaining a distributed ledger, which is maintained by multiple electronic nodes, wherein the distributed ledger includes multiple blocks which are associated at least with one of previously recorded blocks and wherein a new block can be added to the distributed ledger based on a mining process by at least a part of the multiple electronic nodes, the electronic device comprising circuitry configured to:
  perform a mining process of the new block to be added to the distributed ledger, wherein the mining process includes:
  obtaining a hash from the previously recorded blocks,
  using the hash to select a subset of dictionary elements from a predefined dictionary,
  computing a sparse representation of each sub-block of the new block based on the selected subset of dictionary elements to compress data of the new block, and
  adding the compressed new block to the distributed ledger, wherein the distributed ledger represents digital currency used to buy physical goods and/or services.

2. The electronic device of claim 1, wherein the circuitry is further configured to perform a compression algorithm for compressing data.

3. The electronic device of claim 2, wherein the compression algorithm is based on a non-deterministic polynomial-time hard search problem.

4. The electronic device of claim 1, wherein the compression of the data is further based on a current state of the distributed ledger.

5. The electronic device of claim 1, wherein each block includes multiple sub-blocks, wherein each sub-block includes at least one of: transaction data, video data, image data, audio data, document data.

6. The electronic device of claim 1, wherein the compression includes representing data of the block based on the predefined dictionary.

7. The electronic device of claim 6, wherein the predefined dictionary includes a set of the dictionary elements and the set of the dictionary elements is adapted to the data of the block to be compressed.

8. The electronic device of claim 7, wherein the subset of the set of the dictionary elements is selected based on a current status of the distributed ledger.

9. A method for maintaining a distributed ledger, which is maintained by multiple electronic nodes, wherein the distributed ledger includes multiple blocks which are associated at least with one of previously recorded blocks and wherein a new block can be added to the distributed ledger based on a mining process by at least a part of the multiple electronic nodes, the method comprising:
  performing a mining process of the new block to be added to the distributed ledger, wherein the mining process includes:
  obtaining a hash from the previously recorded blocks,
  using the hash to select a subset of dictionary elements from a predefined dictionary,
  computing a sparse representation of each sub-block of the new block based on the selected subset of dictionary elements to compress data of the new block, and
  adding the compressed new block to the distributed ledger, wherein the distributed ledger represents digital currency used to buy physical goods and/or services.

10. The method of claim 9, wherein the compression of data is based on a compression algorithm for compressing data.

11. The method of claim 10, wherein the compression algorithm is based on a non-deterministic polynomial-time hard search problem.

12. The method of claim 9, wherein the compression of the data is further based on a current state of the distributed ledger.

13. The method of claim 9, wherein each block includes multiple sub-blocks, wherein each sub-block includes at least one of: transaction data, video data, image data, audio data, document data.

14. The method of claim 9, wherein the compression includes representing data of the block based on the predefined dictionary.

15. The method of claim 14, wherein the predefined dictionary includes a set of the dictionary elements.

16. The method of claim 15, wherein the set of the dictionary elements is adapted to the data of the block to be compressed.

17. The method of claim 16, wherein the subset of the set of the dictionary elements is selected based on a current status of the distributed ledger.

* * * * *